United States Patent
Jang et al.

(10) Patent No.: US 9,815,353 B2
(45) Date of Patent: Nov. 14, 2017

(54) METHOD OF MANUFACTURING DOOR FOR VEHICLE

(71) Applicant: Hyundai Motor Company, Seoul (KR)

(72) Inventors: Jun Ho Jang, Gyeonggi-Do (KR); Hoon Mo Park, Gyeonggi-Do (KR); Kyung Moon Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/203,335

(22) Filed: Jul. 6, 2016

(65) Prior Publication Data

US 2017/0166038 A1 Jun. 15, 2017

(30) Foreign Application Priority Data

Dec. 10, 2015 (KR) ........................ 10-2015-0175743

(51) Int. Cl.
*B60J 5/04* (2006.01)
*B21D 22/02* (2006.01)
(Continued)

(52) U.S. Cl.
CPC .......... *B60J 5/0463* (2013.01); *B21D 22/022* (2013.01); *B21D 47/01* (2013.01); *B21D 53/88* (2013.01); *B29C 65/601* (2013.01); *B29C 66/7422* (2013.01); *B29C 70/34* (2013.01); *B29C 70/48* (2013.01); *B60J 5/0402* (2013.01);
(Continued)

(58) Field of Classification Search
CPC ...... B60J 5/0465; B60J 5/0463; B60J 5/0481; B60J 5/0469; B60J 5/0468; B60J 5/0412; B60J 5/0483; B60J 5/0415; B60J 5/0413; B60J 5/0443; B21D 47/01; B21D 53/88; B29C 65/601; B29C 66/7422; B29C 70/48; B29C 70/34; Y10T 29/49622; Y10T 29/49801
See application file for complete search history.

(56) References Cited

U.S. PATENT DOCUMENTS 4,328,642 A * 5/1982 Presto .................... B60J 5/0406
49/502
4,945,682 A * 8/1990 Altman .................. B60J 5/0405
296/146.5
(Continued)

FOREIGN PATENT DOCUMENTS

JP 3588831 B2 11/2004
JP 2006-273272 A 10/2006
(Continued)

*Primary Examiner* — Jermie Cozart
(74) *Attorney, Agent, or Firm* — Mintz Levin Cohn Ferris Glovsky and Popeo, P.C.; Peter F. Corless

(57) ABSTRACT

A method of manufacturing a door for a vehicle includes molding a door inner panel using a polymer composite; molding a door frame assembly using an aluminum alloy or a steel alloy, the door frame assembly defining a space to be opened or closed by a door glass; molding a door outer panel using an aluminum alloy or a steel alloy; molding an impact beam using an aluminum alloy or a steel alloy, the impact beam serving to increase rigidity of a side surface of the door; coupling the molded door frame assembly and the molded impact beam to the door inner panel; and coupling the door inner panel, which is coupled to the door frame assembly and the impact beam, to the door outer panel.

22 Claims, 5 Drawing Sheets

(51) Int. Cl.
*B21D 47/01* (2006.01)
*B21D 53/88* (2006.01)
*B29C 65/60* (2006.01)
*B29C 65/00* (2006.01)
*B29C 70/34* (2006.01)
*B29C 70/48* (2006.01)
*B29K 105/08* (2006.01)
*B29K 307/04* (2006.01)
*B29K 309/08* (2006.01)
*B29L 31/30* (2006.01)

(52) U.S. Cl.
CPC ........... *B60J 5/0413* (2013.01); *B60J 5/0415* (2013.01); *B60J 5/0443* (2013.01); *B60J 5/0483* (2013.01); *B60J 5/0484* (2013.01); *B29K 2105/0872* (2013.01); *B29K 2307/04* (2013.01); *B29K 2309/08* (2013.01); *B29L 2031/30* (2013.01); *Y10T 29/49622* (2015.01); *Y10T 29/49801* (2015.01)

(56) References Cited

U.S. PATENT DOCUMENTS

| | | | |
|---|---|---|---|
| 2003/0090025 A1* | 5/2003 | Nelson | B29C 70/086 264/162 |
| 2003/0160365 A1* | 8/2003 | Brown | B29C 39/10 264/553 |

FOREIGN PATENT DOCUMENTS

| | | |
|---|---|---|
| JP | 2014-091825 A | 5/2014 |
| KR | 20-1998-0048948 U | 10/1998 |
| KR | 10-0520595 | 10/2005 |
| KR | 10-2011-0055315 A | 5/2011 |
| KR | 10-2011-0127790 A | 11/2011 |
| KR | 10-2012-0073381 | 7/2012 |
| KR | 10-2013-0068988 | 6/2013 |

* cited by examiner

METHOD OF MANUFACTURING DOOR FOR VEHICLE

CROSS-REFERENCE TO RELATED APPLICATION

This application claims under 35 U.S.C. §119(a) the benefit of Korean Patent Application No. 10-2015-0175743, filed on Dec. 10, 2015 in the Korean Intellectual Property Office, the entire contents of which are incorporated herein by reference.

BACKGROUND

1. Field of the Invention

The present invention relates to a method of manufacturing a door for a vehicle and a door manufactured by the same, and more particularly, to a method of manufacturing a door with reduced weight, and thus a reduced manufacturing cost.

2. Description of the Related Art

Generally, a vehicle frame door constitutes the frame structure of a door. As illustrated in FIG. 1 (RELATED ART), the vehicle frame door includes a door frame assembly 1, which defines a space to be opened or closed by a door glass, and a door outer panel 2 and a door inner panel 3, which respectively form the outer contour and the inner contour of the door.

The door frame assembly 1 serves as a window frame in which the door glass is installed, and includes a frame portion and a rail portion. Here, the rail portion is a portion into which the edge of the door glass is inserted so that the door glass, which is movable upward or downward to open or close a window, is guided along the rail portion.

The door outer panel 2 and the door inner panel 3 are spaced apart from each other by a predetermined distance in the width direction of a vehicle, and at least portions of the peripheries of the door outer panel 2 and the door inner panel 3 are coupled to each other via bonding such as, for example, hemming or welding, thereby forming a closed cross section having a section coefficient that satisfies the required rigidity of the door.

Conventionally, the outer panel 2 and the inner panel 3 of the door are manufactured by, for example, a pressing process using steel (i.e. a steel sheet), and are then assembled with each other.

In addition, an impact beam 4 is installed between the door outer panel 2 and the door inner panel 3 so as to increase the rigidity of the side surface of the door in order to improve the collision performance of the side surface.

The impact beam 4 is a reinforcement beam that is installed to increase the strength of the door against side surface collisions. The impact beam 4 may be installed on the door inner panel 3 as both ends of the impact beam 4 are secured to the door inner panel 3 by means of beam brackets 5.

In addition, a door member 6 may be mounted to the door inner panel 3, separately from the impact beam 4. The door member 6 mounted to the door inner panel 3 and the door outer panel 2 located at the outer side of the door member 6 are in contact with each other, or are bonded to each other using, for example, a sealant or an adhesive.

As such, the door member 6 serves to prevent vibrations or shaking of the door outer panel 2 that may occur during driving, and also serves to prevent bending of the door outer panel 2 due to, for example, slight shocks.

In addition, for example, a belt outer panel 7 for increasing the strength of a door belt line, or a door hinge (not illustrated) may be installed.

In the related art, the respective elements constituting the frame door have been manufactured using steel. For example, as illustrated in FIG. 2 (RELATED ART), the door inner panel 3 may be manufactured by molding a steel sheet, such as a tailor welded blank (TWB), in a mold (e.g. a single mold).

Here, a TWB is manufactured by cutting sheets, which have, for example, different thicknesses and strengths and are formed of different materials, into an appropriate size and shape, and then, bonding the sheets to each other by, for example, mesh seam welding, plasma arc welding, or laser welding. The inner panel 3 may be completed by molding one piece of TWB.

Meanwhile, in order to reduce the weight of the vehicle, the elements constituting the door need to be manufactured using lightweight materials.

When moving elements of the vehicle, such as the door, are reduced in weight, in addition to reducing the weight of the vehicle, the center of gravity of the vehicle may be lowered and the moment of rotational inertia may be reduced, which may increase the stability of driving and the merchantability of the vehicle.

There is known technology for manufacturing the respective elements of the door using aluminum materials. The weight of the door may be reduced when the respective elements of the door are formed of aluminum materials and, for example, a pressing, roll-forming, extrusion or bending process is optimal.

For example, in the case of the door inner panel, as illustrated in FIG. 2, respective parts of the door inner panel are molded separately in respective molds (e.g. two molds) using two aluminum alloy sheets, and thereafter the molded parts are bonded to each other via, for example, riveting, adhesive attachment, or welding so as to complete the integrated door inner panel 3.

Alternatively, the door inner panel may be molded in a single mold using a TWB formed of aluminum materials.

However, when the door inner panel is manufactured using aluminum materials, there are several problems such as, for example, limitations on the molding ability, welding ability, and bonding strength, increases in the level of difficulty and the level of complexity in the process of molding the respective elements, and increases in the number of molds used and mold costs and, consequently, the overall costs of the respective elements.

SUMMARY

Therefore, the present invention provides a method of manufacturing a door for a vehicle, which may efficiently achieve weight reduction, make it easier to manufacture respective elements constituting the door, and improve door performance.

In accordance with one aspect of the present invention, the above and other objects can be accomplished by the provision of a method of manufacturing a door for a vehicle, the method including steps of: molding a door inner panel using a polymer composite; molding a door frame assembly using an aluminum alloy or a steel alloy, the door frame assembly defining a space to be opened or closed by a door glass; molding a door outer panel using an aluminum alloy or a steel alloy; molding an impact beam using an aluminum alloy or a steel alloy, the impact beam serving to increase rigidity of a side surface of the door; coupling the molded door frame assembly and the molded impact beam to the door inner panel; and coupling the door inner panel, which has been coupled to the door frame assembly and the impact beam, to the door outer panel.

In accordance with another aspect of the present invention, there is provided a door for a vehicle manufactured by the manufacturing method, the door including a door inner panel formed of a polymer composite, a door frame assembly formed of an aluminum alloy or a steel alloy, a door outer panel formed of an aluminum alloy or a steel alloy, and an impact beam formed of an aluminum alloy or a steel alloy.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
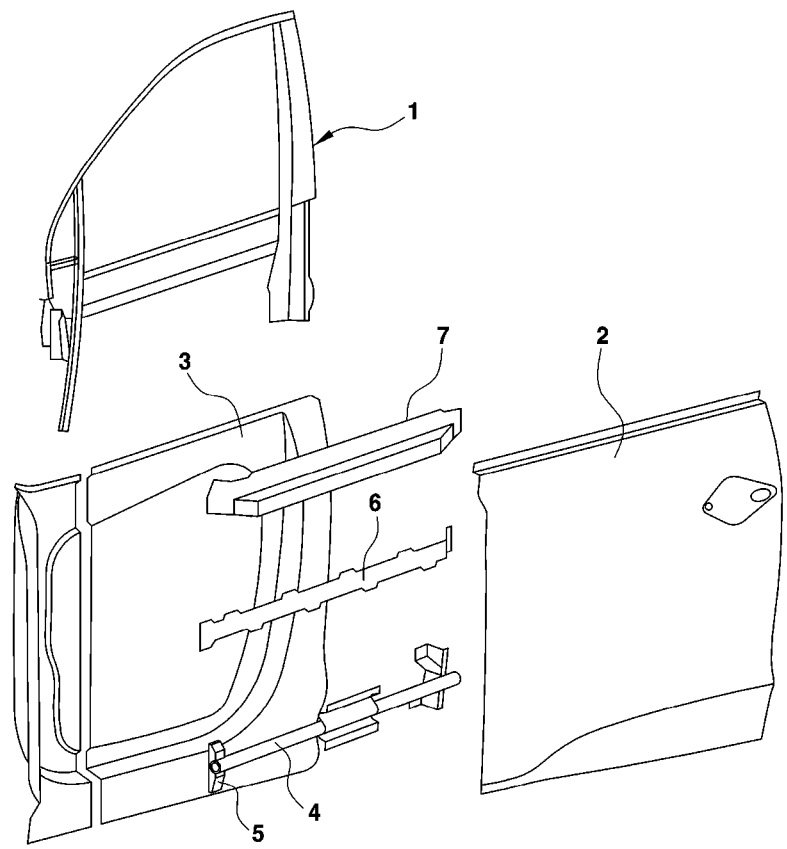
FIG. 1 (RELATED ART) is an exploded perspective view illustrating the configuration of a frame structure of a general frame door.
Figure 2:
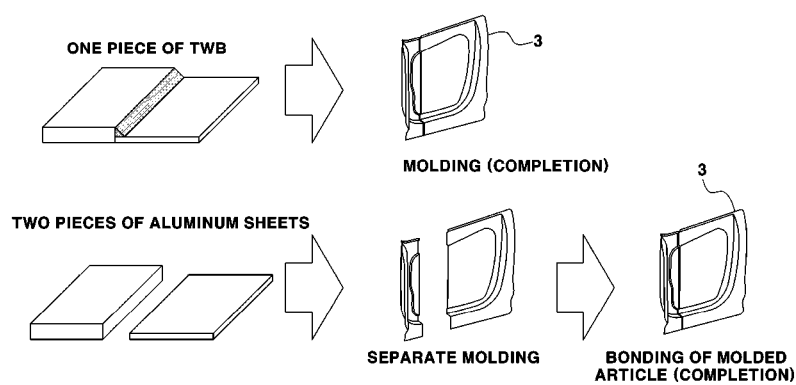
FIG. 2 (RELATED ART) is an explanatory view illustrating a conventional method of manufacturing a door inner panel.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described in detail with reference to the accompanying drawings to allow those skilled in the art to easily practice the present invention. However, the present invention may be embodied in many different forms and is not limited to embodiments described herein.

The present invention is designed to provide a method of manufacturing a door for a vehicle and a door manufactured by the same, which may prevent increased manufacturing costs attributable to the use of various materials for weight reduction, and which may efficiently achieve weight reduction, make it easier to manufacture respective elements constituting the door, and improve door performance.

The present invention enables the manufacture of a lightweight door formed of multiple kinds of materials by combining various materials of different elements or by combining various materials in each element, rather than simply using lightweight materials for an efficient reduction in weight.

In particular, the present invention discloses a method of manufacturing a metal-polymer composite lightweight door using multiple kinds of materials, which may minimize an increase in the level of difficulty in the processes of manufacturing and assembling respective constituent elements of the door and may reduce the weight of the respective constituent elements.

In this way, the present invention may flexibly respond to various demands with regard to vehicle models and constituent elements such as, for example, a lower level of difficulty in processing, reduced manufacturing costs and prices, and increased performance and weight reduction.

Figure 3:
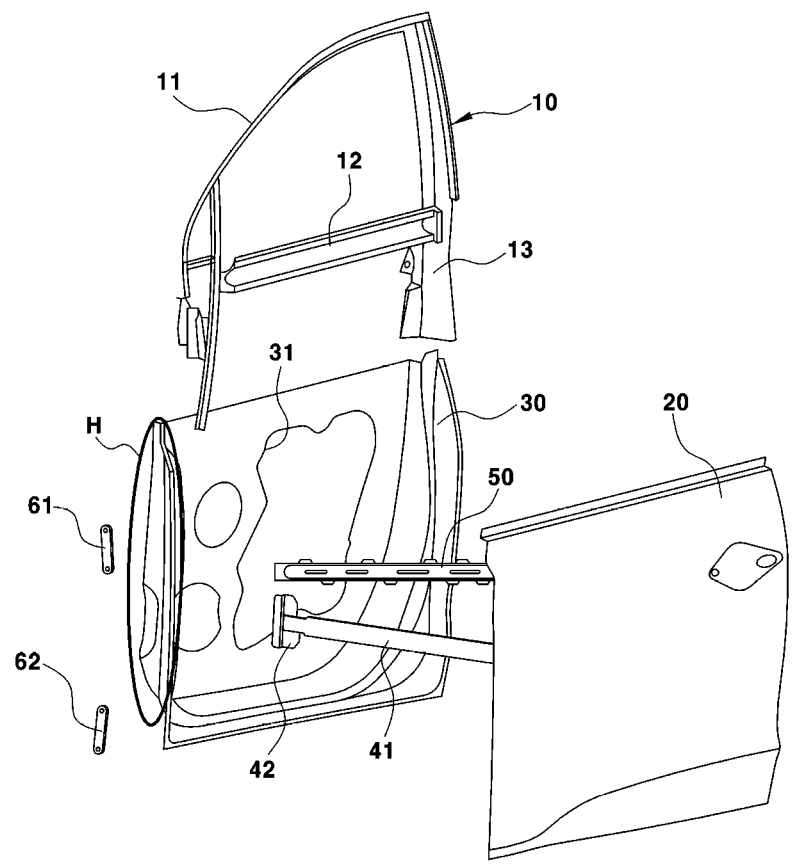
FIG. 3 is an exploded perspective view illustrating the configuration of a frame structure of a door for a vehicle in accordance with an embodiment of the present invention.

FIG. 3 is an exploded perspective view illustrating the configuration of the frame structure of a door for a vehicle in accordance with an embodiment of the present invention.

The present invention relates to the frame structure of a door and a method of manufacturing the same, and has a feature in that a door inner panel is formed of a polymer composite and the other constituent elements of the door are formed of aluminum alloys and steel alloys.

Referring to FIG. 3, a vehicle frame door in accordance with an embodiment of the present invention is the frame structure of a door, and includes a door frame assembly 10, which defines a space to be opened or closed by a door glass, and a door outer panel 20 and a door inner panel 30, which respectively form the outer contour and the inner contour of the door.

The door frame assembly 10 is a part that serves as a window frame in which the door glass is installed, and includes a frame portion and a rail portion. Here, the rail portion is a portion into which the edge of the door glass is inserted so that the door glass, which is movable upward or downward to open or close a window, is guided along the rail portion.

In the embodiment of the present invention, the door frame assembly 10 may be constructed by combining a plurality of elements, and may include a main frame 11, which has a rail portion configured to form the upper portion and the side portion of a window frame, a lower frame 12, which forms the lower portion corresponding to the position of a door belt line, and bonding frames 13 and 13', which are bonded to the door inner panel 30.

Here, a belt outer panel (not illustrated) of the door belt line may be installed in the lower frame 12.

The bonding frames 13 and 13' may be installed to opposite sides of the lower end of the main frame 11 so as to create a wide-area bonding with the door inner panel 30. The bonding frame may be classified into an integrated-type bonding frame 13', which integrally extends from one side of the lower end of the main frame 11, and an assembly-type bonding frame 13, which is separately manufactured and then bonded to the other side of the lower end of the main frame 11.

The respective constituent elements of the door frame assembly 10 described above may be manufactured using steel alloys or aluminum alloys. For example, the constituent elements may be molded via pressing or roll-forming using steel alloys, or may be formed via extrusion and bending (3D bending) using aluminum alloys.

Alternatively, the respective elements of the door frame assembly 10 may be manufactured using a polymer composite such as fiber-reinforced plastics (FRP), and may be manufactured by performing, for example, pressing or resin transfer molding (RTM) after fiber stacking and weaving in order to satisfy the required shape and strength thereof.

That is, a fabric or prepreg, which is prefabricated using a plastic resin and a reinforcement material such as glass fibers or carbon fibers, may be used.

Meanwhile, the door outer panel 20 and the door inner panel 30 are spaced apart from each other by a predetermined distance in the width direction of a vehicle, and at least portions of the peripheries of the door outer panel 20 and the door inner panel 30 are coupled to each other via bonding such as, for example, hemming or welding, thereby forming a closed cross section having a section coefficient that satisfies the required rigidity of the door.

In the embodiment of the present invention, the outer panel 20 of the door may be manufactured by press-molding a steel alloy sheet or an aluminum alloy sheet.

In addition, the inner panel 30 of the door may be manufactured using a polymer composite, and more particularly, fiber-reinforced plastics (FRP). The door inner panel 30 will be described later in greater detail.

In the embodiment of the present invention, an impact beam 41 is installed between the door outer panel 20 and the door inner panel 30 so as to increase the rigidity of the side surface of the door in order to improve the collision performance of the side surface. The impact beam 41 is a reinforcement beam that is installed to increase the strength of the door against side surface collisions.

The impact beam 41 may be installed on the door inner panel 30 as both ends of the impact beam 41 are secured to the door inner panel 30 by means of beam brackets 42.

In the embodiment of the present invention, the impact beam 41 may be manufactured by molding a steel alloy sheet into a pipe shape, or may be manufactured by hot stamping a steel alloy sheet.

In particular, to achieve a reduction in weight, the impact beam 41 may be manufactured using an aluminum alloy, or may be manufactured by extrusion-molding an aluminum alloy sheet.

In addition, the beam brackets 42, used to mount the impact beam 41 to the door inner panel 30, may be manufactured by press-molding a steel alloy sheet or an aluminum alloy sheet.

Subsequently, a door member 50 may be mounted to the door inner panel 30, separately from the impact beam 41. The door member 50 mounted to the door inner panel 30 and the outer panel 20 located at the outer side of the door member 50 are in contact with each other, or are bonded to each other using, for example, a sealant or an adhesive.

That is, the door member 50 installed to the door inner panel 30 supports the door outer panel 20 with, for example, a sealant or an adhesive interposed therebetween.

As such, the door member 50 serves to prevent vibrations or shaking of the door outer panel 20 that may occur during driving, and also serves to prevent bending of the door outer panel 20 due to, for example, slight shocks.

The door member 50 may be manufactured by press-molding a steel alloy sheet or an aluminum alloy sheet.

In addition, door hinges 61 and 62 may be installed to the door inner panel 30 so as to hingedly couple the door to a vehicle body. The door hinges 61 and 62 may be manufactured via pressing or forging of a steel alloy.

Next, the door inner panel 30, manufactured using a polymer composite, in accordance with the present invention will be described.

In the embodiment of the present invention, the door inner panel 30 may be manufactured using fiber-reinforced plastics (FRP), and more particularly, glass fiber-reinforced plastics (GFRP) or carbon fiber-reinforced plastics (CFRP).

When the door inner panel 30 is manufactured using fiber-reinforced plastics (hereinafter referred to as "FRP"), a pressing or resin transfer molding process may be used. When continuous fiber-reinforced prepreg is used, a hot pressing process may be used. When a fiber-reinforced fabric mat is used, an RTM process may be used.

When the continuous fiber-reinforced prepreg is used, the door inner panel is manufactured by preparing continuous fiber-reinforced prepreg sheets, which are formed of a composite acquired by reinforcing a resin with continuous fibers (glass fibers or carbon fibers), stacking the prepared continuous fiber-reinforced prepreg sheets one above another, and performing hot press-molding.

Here, the resin may be polypropylene (PP), polyamide (PA), epoxy, or the like.

In the case of the RTM process, a fiber-reinforced mat, formed of glass fibers or carbon fibers, is mounted in a mold, and a resin material, mixed with a curing agent and other additives, is injected into and cured in the mold in which the fiber-reinforced mat has been mounted. At this time, the fiber-reinforced material or the resin and the curing agent and other additives may be selected from known materials, so long as they can satisfy the level of rigidity required in the door panel.

Here, the resin may be polypropylene (PP), polyamide (PA), epoxy, or the like.

In addition, the fiber-reinforced fabric mat may have a fiber orientation structure capable of minimizing anisotropy in order to prevent distortion of the molded inner panel 30. For example, twill fabric having low fiber anisotropy may be used.

In addition, when the door inner panel 30 is manufactured by molding fiber-reinforced plastics, many layers of prepreg sheets or fabric sheets are stacked and pressed in a mold, which may generate wrinkles.

In particular, in the case of the door inner panel 30 having a drawing shape in which a shape sharply varies as represented by the portion "H" in FIG. 3, there is a high possibility of the generation of wrinkles.

Regarding the portion "H" in FIG. 3, it exhibits a sharp variation in shape in that it is bent by an angle of approximately 90 degrees during molding, and thus wrinkles may be generated in the surrounding sheet portion.

Therefore, it is necessary to form large panel penetration holes in the prepreg sheets or the fabric sheets in advance, in order to prevent wrinkles from being generated in the central portion of the door inner panel 30 during molding.

It is possible to prevent the generation of wrinkles in the sheet during molding by applying the hole to the central portion of the door inner panel 30.

Meanwhile, a method of coupling the respective elements of the door frame structure to the door inner panel 30 formed of fiber-reinforced plastics as described above will be described below.

Figure 4:
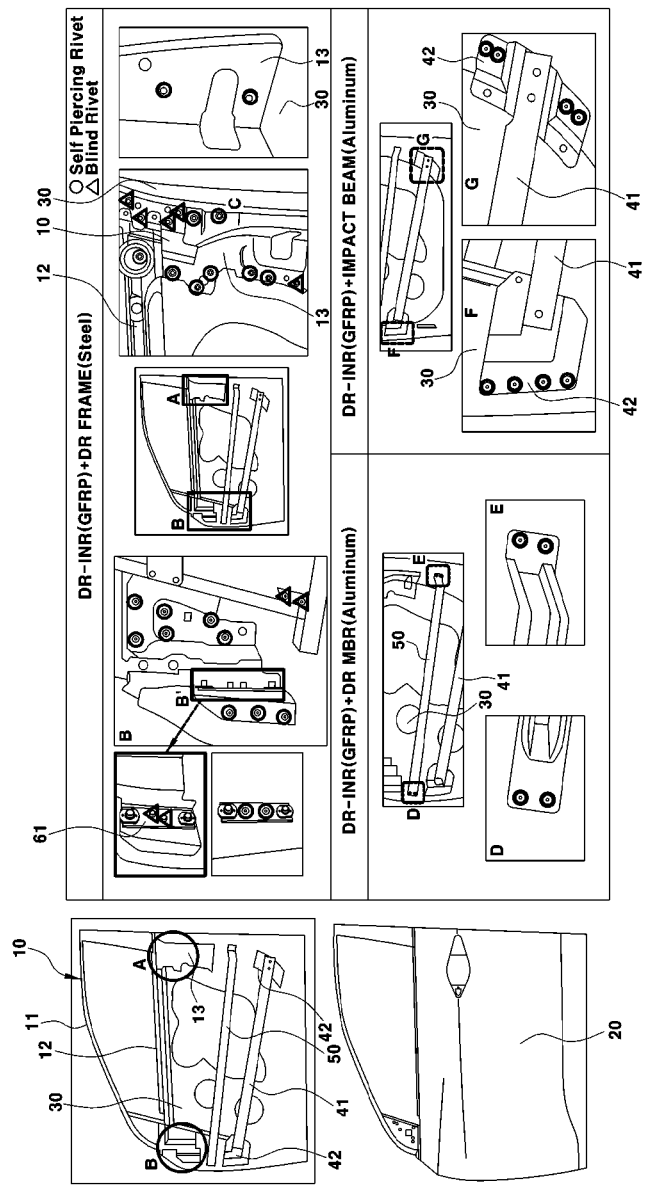
FIG. 4 is a view illustrating bonding between a door inner panel and respective elements for the manufacture of the door of FIG. 3 in accordance with an embodiment of the present invention.

FIG. 4 is a view illustrating bonding between the door inner panel 30 and the respective elements for the manufacture of the vehicle door in accordance with an embodiment of the present invention. Riveting may be used to bond the door inner panel 30 and the respective elements to each other.

That is, for example, the door frame assembly 10, the door member 50, the impact beam 41, and the door hinges 61 and 62 may be coupled to the door inner panel 30 by means of rivets. The rivets may be known blind rivets or self-piercing rivets.

Among these, in the case of using blind rivets, in the state in which elements to be bonded overlap each other, holes for riveting are first formed in the respective elements, and subsequently the blind rivets are inserted into the holes so as to couple the elements to each other.

In addition, the self-piercing rivets have been developed to replace existing spot welding. In the case of using self-piercing rivets, a rivet device hydraulically press-fits the rivets into sheets to be bonded to each other without a separate hole-forming process so that the rivets penetrate a parent metal and expand along with the parent metal to realize bonding.

In the embodiment of the present invention, bonding using the blind rivets may be used in the triple-layered bonding regions between the elements, and bonding using the self-piercing rivets may be used in the double-layered bonding regions between the elements.

Referring to FIG. 4, among respective rivet bonding regions, regions indicated by "○" are double-layered bonding regions using self-piercing rivets. For example, the self-piercing rivets may be applied to bonding regions between the bonding frames 13 and 13' of the door assembly and the door inner panel 30 designated by "A" and "B", bonding regions between the door member 50 and the door inner panel 30 designated by "D" and "E", and bonding regions between the beam brackets 42 and the door inner panel 30 designated by "F" and "G."

In the embodiment of the present invention, the self-piercing rivets need to be fastened from the door inner panel 30, which is formed of a polymer composite, toward, for example, the door member 50 or the beam brackets 42, which are formed of metal materials.

In addition, regions indicated by "△" are triple-layered bonding regions using blind rivets. For example, the blind rivets may be applied to the triple-layered bonding region at which the door hinge 61, the integrated-type bonding frame 13' and the door inner panel 30 overlap one another as designated by "B" and the triple-layered bonding region at which the lower end of the main frame 11 and the assembly-type bonding frame 13 of the door frame assembly 10, and the door inner panel 30 overlap one another as designated by "A."

Figure 5:
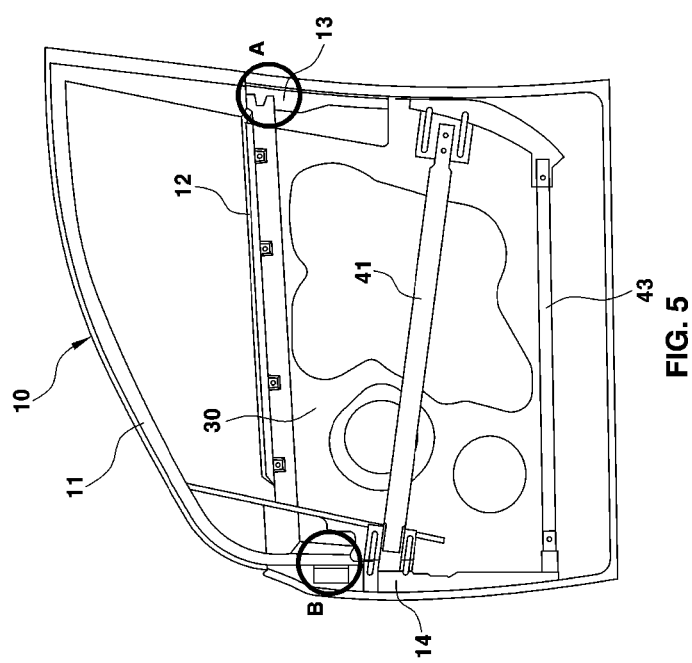
FIG. 5 is a view illustrating another installation method of an impact beam provided in the door in accordance with an embodiment of the present invention.

Next, FIG. 5 is a view illustrating another installation method of the impact beam 41 in the door for a vehicle in accordance with an embodiment of the present invention. Unlike conventional metallic door inner panels, in the case of the door inner panel formed of FRP, the bonding regions of the door inner panel with the other elements, in particular, the bonding regions of the door inner panel with the impact beam may be damaged by external shocks due to the low elongation of FRP.

When the bonding regions between the door inner panel and the impact beam are damaged, the inner panel may not support external force.

Therefore, as illustrated in FIG. 5, a frame bonding portion 14 may be installed so as to integrally extend downward from each of the bonding frames 13 and 13' of the door frame assembly 10, such that impact beams 41 and 43 are bonded to the frame bonding portion 14.

The frame bonding portion 14 may integrally extend downward from the bonding frame of the door frame assembly 10, or may be separately manufactured using the same material (e.g. a steel alloy or an aluminum alloy), and thereafter may be bonded to the bonding frame 13 or 13' so as to extend downward therefrom.

The frame bonding portion 14 may also be coupled to the door inner panel 30 via riveting. At this time, self-piercing rivets may be used.

In addition, the frame bonding portion 14 and the impact beams 41 and 43 may be bonded to each other using beam brackets (not illustrated) interposed therebetween. More specifically, the beam bracket coupled to the impact beam 41 may be coupled to the frame bonding portion 14 via, for example, welding or riveting. Alternatively, each end of the impact beam 41 and the frame bonding portion 14 may be directly coupled to each other via, for example, welding or riveting.

The following table 1 illustrates materials that may be applied to the respective elements of the door in Example of the present invention, and the present invention is not limited thereto.

TABLE 1

| Element Name | Example | |
|---|---|---|
| Door Outer Panel | Aluminum Alloy | A16014 |
| Door Member | | A5052 |
| Impact Beam | | A7H01 |
| Beam Bracket | | A5052 |
| Door Frame Assembly | Steel Alloy | SGACC |
| Door Hinge | | SAPH370-P |
| Door Inner Panel | Polymer Composite | GFRP |
| Weight Reduction Percentage | | 60% |

As illustrated in Table 1, in the case of the door frame structure in accordance with Example, the door inner panel 30 was manufactured using a polymer composite such as glass fiber-reinforced plastics (GFRP), and the door outer panel 20, the door member 50, the impact beam 41, and the beam bracket 42 were manufactured using aluminum alloys that satisfy the required level of rigidity thereof.

On the other hand, the door frame assembly 10 and the door hinges 61 and 62 were manufactured using steel alloys. In the case of Comparative Example, all the respective elements were manufactured using steel alloys as in the related art.

In Table 1, the weight reduction percentage represents the proportion of the weight in Example when the weight in Comparative Example is 100%, and it is seen that the present invention may accomplish the weight reduction percentage of 60%.

As is apparent from the above description, in a method of manufacturing a door for a vehicle in accordance with the present invention, among constituent elements of the frame structure of the door, a door inner panel is manufactured using a lightweight polymer composite and the other constituent elements are manufactured using steel alloys or lightweight aluminum alloys. As a result, the present invention may prevent problems of the related art such as increased manufacturing costs attributable to the use of various materials for weight reduction, and may efficiently achieve weight reduction, make it easier to manufacture respective elements constituting the door, and improve door performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a door for a vehicle, the method comprising the steps of:
    molding a door inner panel using a polymer composite;
    molding a door frame assembly using an aluminum alloy or a steel alloy, the door frame assembly defining a space to be opened or closed by a door glass;
    molding a door outer panel using an aluminum alloy or a steel alloy;
    molding an impact beam using an aluminum alloy or a steel alloy, the impact beam serving to increase rigidity of a side surface of the door;
    coupling the molded door frame assembly and the molded impact beam to the door inner panel; and
    coupling the door inner panel, which is coupled to the door frame assembly and the impact beam, to the door outer panel.

2. The method according to claim 1, wherein the polymer composite includes fiber-reinforced plastics.

3. The method according to claim 2, wherein the fiber-reinforced plastics are glass fiber-reinforced plastics or carbon fiber-reinforced plastics.

4. The method according to claim 1, wherein the door inner panel is molded by stacking continuous fiber-reinforced prepreg sheets, acquired by reinforcing a resin with continuous glass fibers or carbon fibers, one above another, and then performing hot press-molding thereon.

5. The method according to claim 4, wherein panel penetration holes are formed in the prepreg sheets in advance in order to prevent wrinkles from being generated in a central portion of the door inner panel during molding.

6. The method according to claim 1, wherein the door inner panel is molded by a resin transfer molding (RTM) process in which a fiber-reinforced fabric mat, formed of glass fibers or carbon fibers, is mounted in a mold, and a resin is injected into and cured in the mold in which the fiber-reinforced fabric mat is mounted.

7. The method according to claim 6, wherein a panel penetration hole is formed in the fabric mat in advance in order to prevent wrinkles from being generated in a central portion of the door inner panel during molding.

8. The method according to claim 6, wherein a twill fabric is used as the fiber-reinforced fabric mat.

9. The method according to claim 1, wherein the impact beam is provided at both ends thereof with beam brackets molded using a steel alloy or an aluminum alloy, and the impact beam is coupled to the door inner panel as the beam brackets are bonded to the door inner panel.

10. The method according to claim 1, wherein a door member is installed to the door inner panel and is configured to prevent vibrations or shaking of the door outer panel during vehicle driving while supporting the door outer panel and to prevent bending of the door outer panel due to shocks, and
    wherein the door member is molded using a steel alloy or an aluminum alloy.

11. The method according to claim 10, wherein the door member is coupled to the door inner panel via riveting.

12. The method according to claim 11, wherein a self-piercing rivet is used for the riveting.

13. The method according to claim 1, wherein the door frame assembly and the impact beam are coupled to the door inner panel via riveting.

14. The method according to claim 13, wherein both ends of the impact beam are provided with beam brackets molded using a steel alloy or an aluminum alloy, and the impact beam is coupled to the door inner panel as the beam brackets are bonded to the door inner panel, and
    wherein the beam brackets are coupled to the door inner panel via riveting.

15. The method according to claim 14, wherein a self-piercing rivet is used for the riveting.

16. The method according to claim 13, wherein the door frame assembly is coupled to the door inner panel through a bonding frame via riveting, and
    wherein the bonding frame for the bonding between the door frame assembly and the door inner panel is integrally formed with a lower end of a main frame, which forms an upper portion and a side portion of a window frame, or is separately manufactured and assembled with the lower end of the main frame.

17. The method according to claim 16, wherein, when the bonding frame is integrally formed with the lower end of the main frame, the bonding frame and the door inner panel are arranged to overlap each other so as to be coupled to each other using a self-piercing rivet.

18. The method according to claim 16, wherein, when the bonding frame is separately manufactured, and is then assembled with the lower end of the main frame, the bonding frame, the lower end of the main frame, and the door inner panel are arranged to overlap one another so as to be coupled to one another using a blind rivet.

19. The method according to claim 16, wherein the bonding frame, integrally formed with the lower end of the main frame, the door inner panel, and a door hinge are arranged to overlap one another so as to be coupled to one another using a blind rivet.

20. The method according to claim 16, wherein a frame bonding portion integrally extends downward from the bonding frame or is separately manufactured and then bonded to the bonding frame so as to extend therefrom, and
    wherein the frame bonding portion is coupled to the door inner panel and each end of the impact beam is coupled to the frame bonding portion so that the impact beam is coupled to the door inner panel through the frame bonding portion.

21. The method according to claim 20, wherein the frame bonding portion is coupled to the door inner panel via riveting.

22. The method according to claim 21, wherein the frame bonding portion is arranged to overlap the door inner panel so as to be coupled to the door inner panel using a self-piercing rivet.

* * * * *